H. B. BEACH.
DRILL-CHUCKS.

No. 194,122. Patented Aug. 14, 1877.

WITNESSES:

INVENTOR:
H. B. Beach.
BY
ATTORNEYS.

UNITED STATES PATENT OFFICE.

HENRY B. BEACH, OF WEST MERIDEN, CONNECTICUT.

IMPROVEMENT IN DRILL-CHUCKS.

Specification forming part of Letters Patent No. 194,122, dated August 14, 1877; application filed April 16, 1877.

*To all whom it may concern:*

Figure 1:
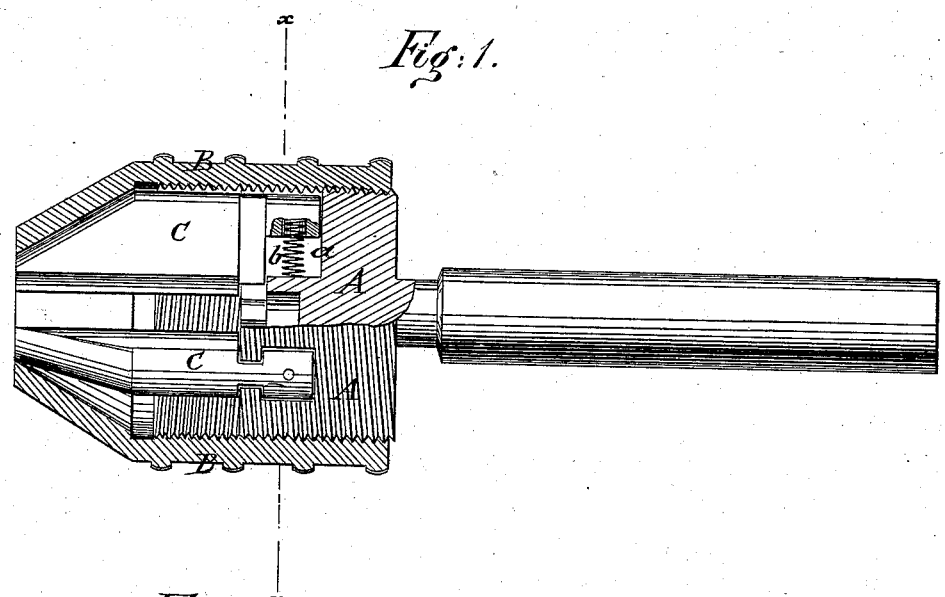
Figure 2:
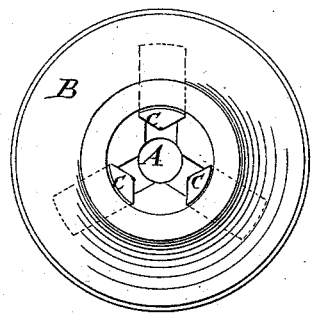
Figure 3:
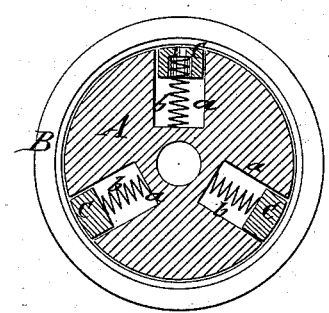

Be it known that I, HENRY B. BEACH, of West Meriden, in the county of New Haven and State of Connecticut, have invented a new and Improved Chuck, of which the following is a specification:

In the accompanying drawing, Figure 1 represents a vertical longitudinal section of my improved chuck; and Figs. 2 and 3 are, respectively, an end view and a vertical transverse section on line *x x*, Fig. 1, of the same.

Similar letters of reference indicate corresponding parts.

The invention relates to an improved chuck of simple and effective construction, which gripes the object with considerable power as the same is inserted into the chuck, passing nearly through the entire length of the same, so as to obtain a greater bearing-surface, and hold the object rigidly and without vibration.

The invention will first be described in connection with the drawing, and then pointed out in the claim.

In the drawing, A represents the solid center-piece, that is made in one piece with the spindle to be placed in the arbor of the lathe, or to be screwed to the face-plate. The center-piece A is provided with an exterior screw-thread, and with guide-recesses *a* for the jaws C, which are side-grooved to receive tenons of the part A, so that no vibration of the ends of the jaw may be produced, and are pressed in outward direction by spiral springs *b*, resting between the center-piece and in sockets of the rear ends of the jaws. The jaws are moved inward by an outer cap, B, that turns by an interior thread on the center-piece. The cap B bears, by its conical front end, on the correspondingly-tapering jaws C, exerting a uniform pressure upon the outer tapering surface of the same, so as to accurately and steadily draw in the jaws on screwing back the cap over the center-piece, the springs returning the jaws when the pressure is relaxed by the forward screwing of the outer cap. The jaws can be hardened throughout their whole lengths, so as to be of greater strength without springing. They wear equally on their outer contact-surfaces with the cap, instead of wearing at one point merely.

The chuck is readily adjusted to the work by turning the cap forward or backward on the center-piece, the jaws clamping by their interior faces the work with great power.

I am aware that it is not new to use in a chuck a middle part centrally perforated and recessed to receive sliding jaws, the latter being worked by turning a cap and spiral springs; but the springs have been placed between interior recesses of jaws and a ferrule, while I dispense entirely with the ferrule by extending the jaws backward into socket-recesses of part A, so as to prevent any shake or motion toward the axis.

Having thus described my invention, I claim as new and desire to secure by Letters Patent—

A chuck having jaws with rear extensions, acted upon by springs in recesses of part A, and guided without axial displacement by tongues and grooves of the parts A C, as shown and described.

HENRY B. BEACH.

Witnesses:
PAUL GOEPEL,
C. SEDGWICK.